United States Patent
Fujinawa

(10) Patent No.: US 7,845,800 B2
(45) Date of Patent: Dec. 7, 2010

(54) POLARIZATION CONVERTING ELEMENT AND PROJECTOR PROVIDED WITH SAME

(75) Inventor: Nobuhiro Fujinawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 624 days.

(21) Appl. No.: 11/883,297

(22) PCT Filed: Feb. 1, 2006

(86) PCT No.: PCT/JP2006/301641

§ 371 (c)(1),
(2), (4) Date: Jul. 30, 2007

(87) PCT Pub. No.: WO2006/082839

PCT Pub. Date: Aug. 10, 2006

(65) Prior Publication Data

US 2008/0291399 A1    Nov. 27, 2008

(30) Foreign Application Priority Data

Feb. 2, 2005   (JP) .............................. 2005-026047

(51) Int. Cl.
*G03B 21/14* (2006.01)

(52) U.S. Cl. .............................. 353/20; 353/22; 353/23; 353/24; 353/81; 353/98; 359/483; 359/487; 359/495; 359/496; 359/490; 359/491; 359/492; 359/631; 349/5; 349/8; 349/9; 362/19

(58) Field of Classification Search .................... 353/20, 353/81, 98, 99, 22, 23, 24; 359/483, 495, 359/496, 631, 208.1, 583, 487, 490, 491, 359/492; 349/5, 8, 9; 362/19
See application file for complete search history.

(56) References Cited

U.S. PATENT DOCUMENTS

| | | | | |
|---|---|---|---|---|
| 4,755,027 A * | 7/1988 | Schafer | ........................ | 359/487 |
| 6,375,327 B2 * | 4/2002 | Holman et al. | ................. | 353/20 |
| 6,390,626 B2 * | 5/2002 | Knox | ........................... | 353/20 |
| 6,520,643 B1 * | 2/2003 | Holman et al. | ................. | 353/20 |
| 7,131,738 B2 * | 11/2006 | Chan et al. | .................... | 353/119 |
| 7,511,886 B2 * | 3/2009 | Schultz et al. | ............... | 359/489 |
| 2004/0105055 A1 | 6/2004 | Yu et al. | | |

FOREIGN PATENT DOCUMENTS

| | | |
|---|---|---|
| EP | 0 492 636 A1 | 7/1992 |
| JP | A 5-107505 | 4/1993 |
| JP | A 2002-182030 | 6/2002 |

* cited by examiner

*Primary Examiner*—Georgia Y Epps
*Assistant Examiner*—Sultan Chowdhury
(74) *Attorney, Agent, or Firm*—Miles & Stockbridge P.C.

(57) ABSTRACT

A polarization converting element includes: a main body that is made from a transparent member; an incident section that is provided to the main body, and upon which light generated from a light source is incident; an annular reflecting section that is formed on the periphery of the incident section; and a polarization splitting section that is formed opposite to the annular reflecting section on the emission side of light incident upon the incident section. One polarized light component of the incident light passes through the main body and is emitted from the polarization splitting section. Another polarized light component of the incident light is reflected towards the annular reflecting section by the polarization splitting section, and is emitted from the polarization splitting section after having again been reflected by the annular reflecting section and having been converted into light of a same polarization component as the light of the one polarized light component.

12 Claims, 5 Drawing Sheets

(a)

(b)

(c)

(a)

(b)

(c)

POLARIZATION CONVERTING ELEMENT AND PROJECTOR PROVIDED WITH SAME

TECHNICAL FIELD

The present invention relates to a polarization converting element, and to a projection device equipped with the polarization converting element.

BACKGROUND ART

In a projector that includes a liquid crystal panel, in order to reduce the amount of loss of light (normally unpolarized light) incident from the light source upon the liquid crystal panel, and in order to utilize this light with good efficiency, there is included an optical element for aligning the direction of polarization of the incident light into one direction before emitting it. The conventional optical element disclosed in Patent Document #1 is a plate shaped light polarization element in which a polarization splitting layer is provided upon one surface of a transparent parallel flat plate, and, when a ray bundle that has passed through a cylindrical lens is incident thereupon at an angle of 45°, this element separates the incident light into a reflected component that is polarized in one direction, and a transmitted component that is polarized in the other direction. The reflected light component is emitted just as it is at an angle of 90° with respect to the direction of incidence, while the transmitted light component is internally reflected by the opposite side of the transparent parallel flat plate that converts its direction of polarization, and is then emitted in parallel to the reflected light component. According to this optical element, the directions of polarization of the emitted light components are aligned to one another, so that the efficiency of utilization of the light is enhanced (refer to Patent Document 1).

Patent Document 1: Japanese Laid-Open Patent Publication No. H5-107505

DISCLOSURE OF THE INVENTION

Problems to be Solved by the Invention

Since the optical element of Patent Document 1 is a plate-shaped transparent parallel flat plate, the element itself becomes large. Furthermore there has been the problem that it is necessary to angle the transparent parallel flat plate at an angle of 45° with respect to the incident light, and that it is also necessary to perform further positional adjustment of the cylindrical lens and of the polarization splitting layer, that is in the form of stripes provided upon the transparent parallel flat plate; and accordingly the optical positional adjustment during manufacture of the projector has been difficult.

Means for Solving the Problems

A polarization converting element according to a first aspect of the present invention includes: a main body that is made from a transparent member; an incident section that is provided to the main body, and upon which light generated from a light source is incident; an annular reflecting section that is formed on the periphery of the incident section; and a polarization splitting section that is formed opposite to the annular reflecting section on the emission side of light incident upon the incident section, wherein: one polarized light component of the incident light passes through the main body and is emitted from the polarization splitting section; and another polarized light component of the incident light is reflected towards the annular reflecting section by the polarization splitting section, and is emitted from the polarization splitting section after having again been reflected by the annular reflecting section and having been converted into light of a same polarization component as the light of the one polarized light component.

In the polarization converting element according to the first aspect, it is preferable that the incident section is endowed with a condensing function. It is preferable that the polarization splitting section is formed with a concave conical surface shape. The polarization splitting section may have a concave curved surface shape in the neighborhood of an axis of rotational symmetry of the concave conical surface; and the light of the one polarized light component may be emitted from a portion of the concave curved surface shape substantially parallel to the axis of rotational symmetry. It is preferable that the annular reflecting section is formed with a convex conical surface shape.

In the polarization converting element according to the first aspect, it is preferable that the main body, the incident section, the annular reflecting section, and the polarization splitting section are formed with rotationally symmetric shapes. The main body may be formed in a shape of a cylinder one end of which is closed. The polarization splitting section may be a polarization splitting layer formed upon a surface of the main body. The annular reflecting section may include a quarter-wave plate and a reflecting surface, formed upon a surface of the main body.

A projection device according to a second aspect of the present invention includes: a light source; a polarization converting element that emits light generated from the light source as light of a single polarized component; a display panel upon which the light emitted from the polarization converting element is incident; and a projection optical system that projects light that has passed through the display panel upon a screen. It is preferable that the light source is a point light source. The projection optical system may include a polarization splitting section, a quarter-wave plate, and a condensing mirror; and light that has passed through the display panel may be reflected by the polarization splitting section and passes through the quarter-wave plate, and then, after having been reflected by the condensing mirror, pass through the quarter-wave plate and the polarization splitting section.

A polarization converting element according to a third aspect of the present invention includes: an incident section upon which light generated from a light source is incident; an annular reflecting section that is formed on the periphery of the incident section; and a polarization splitting section that is formed opposite to the annular reflecting section on the emission side of light incident upon the incident section, wherein: one polarized light component of the incident light passes through the polarization splitting section; and another polarized light component of the incident light is reflected towards the annular reflecting section by the polarization splitting section, and passes through the polarization splitting section after having again been reflected by the annular reflecting section and having been converted into light of a same polarization component as the light of the one polarized light component.

It is to be noted that the annular reflecting section may be replaced with an annular reflecting means.

Advantageous Effect of the Invention

According to the polarization converting element of the present invention, it is possible to make the element itself more compact, and furthermore, when installing this element in a projection device, it is possible to perform adjustment of its optical position more conveniently.

BRIEF DESCRIPTION OF THE DRAWINGS

FIG. 2(a) is a sectional view of the polarization converting element; FIG. 2(b) is a plan view of the polarization converting element; and FIG. 2(c) is a bottom view of the polarization converting element;

FIG. 4(a) is a figure showing optical paths in the vicinity of the optical axis of the polarization converting element; FIG. 4(b) is a figure showing optical paths at peripheral portions of the polarization converting element that are distant from its optical axis; and FIG. 4(c) is a partial enlarged view of a polarization splitting section of the polarization converting element.

BEST MODE FOR CARRYING OUT THE INVENTION

In the following, a polarization converting element and projection device according to the present invention will be explained with reference to FIGS. 1 through 4(c). In FIGS. 1 through 4(c), the same reference symbols are appended to the same structural components, and the directions are referred to orthogonal X-Y-Z coordinates.

First Embodiment

Figure 1:
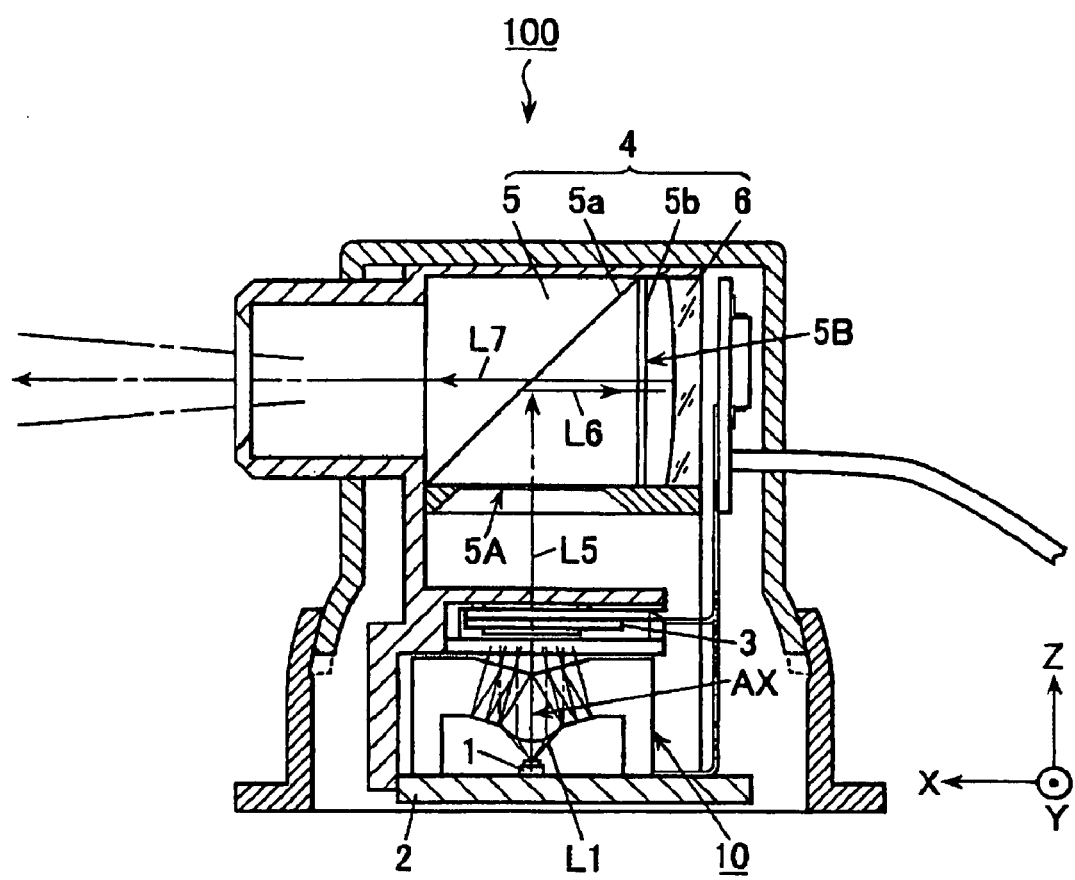
FIG. 1 is an overall structural figure schematically showing the structure of a projector according to a first embodiment of the present invention.
Figure 2:
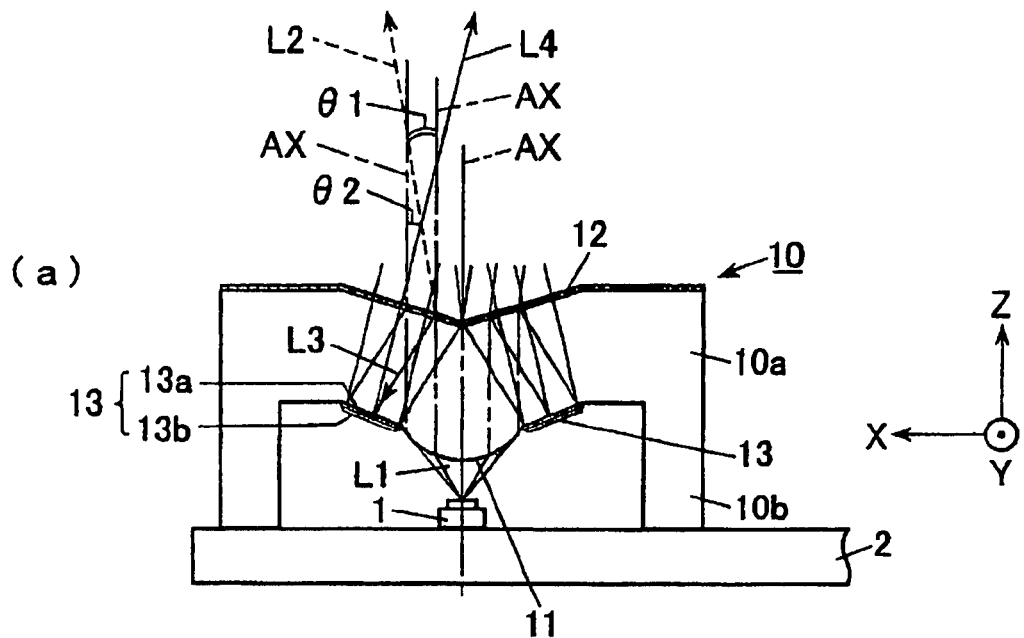
FIG. 2(a) through 2(c) are figures schematically showing the structure of a polarization converting element according to the first embodiment of the present invention.
Figure 2:
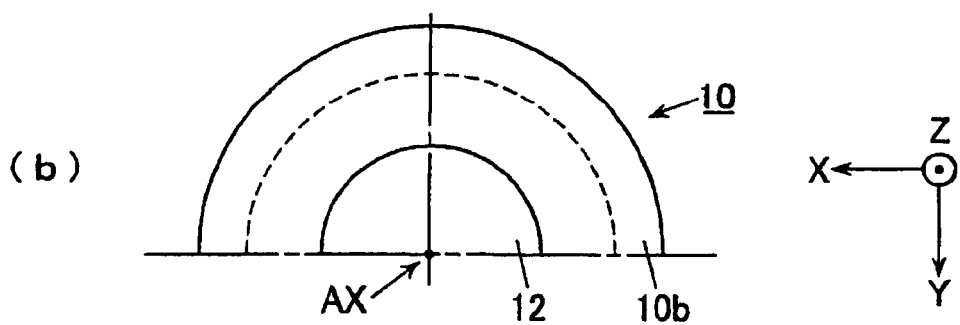
Figure 2:
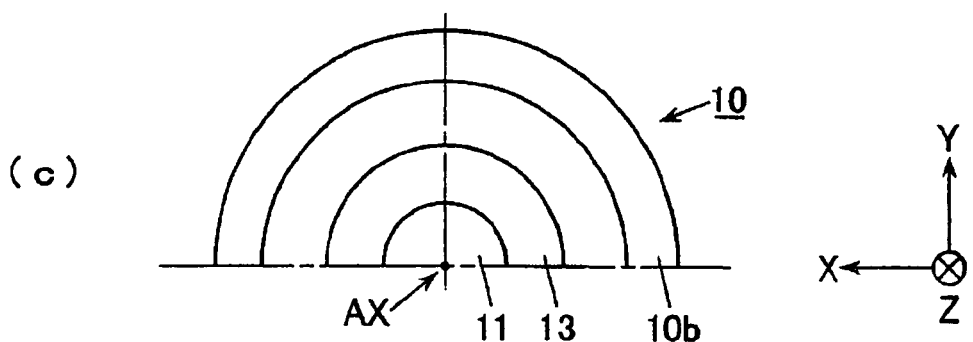
Figure 3:
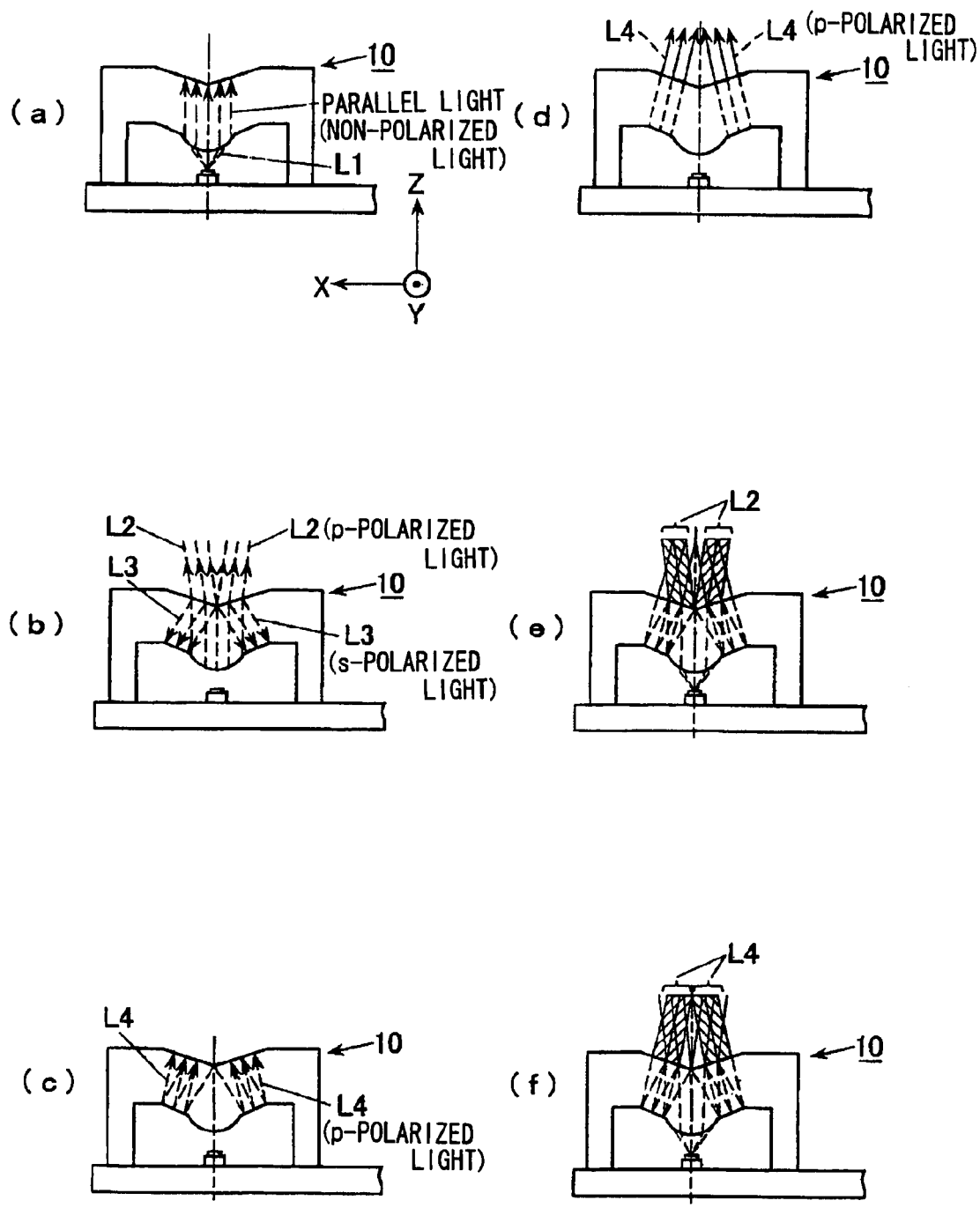
FIGS. 3(a) through 3(f) are figures for explanation of the process of polarized light conversion, performed by this polarization converting element according to the first embodiment of the present invention.

FIG. 1 is an overall structural figure schematically showing the structure of a projector (a projection device) according to a first embodiment of the present invention. And FIG. 2(a) through 2(c) are figures schematically showing the structure of a polarization converting element according to the first embodiment of the present invention; FIG. 2(a) is a sectional view of this polarization converting element 10; FIG. 2(b) is a plan view of this polarization converting element 10 (of which only one half is shown in the figure); and FIG. 2(c) is a bottom view of the polarization converting element 10 (again only one half is shown in the figure). Moreover, FIGS. 3(a) through 3(f) are figures for explanation of the process of polarized light conversion, performed by this polarization converting element 10 according to the first embodiment of the present invention.

As shown in FIG. 1, this projector 100 includes, mounted upon a metallic base 2, a compact point light source (for example an LED 1) that emits light L1 that is non-polarized light, a polarization converting element 10 that aligns the direction of polarization of the light from the LED 1 and emits the resulting light, a liquid crystal panel 3 upon which information such as characters or drawings or the like is displayed for projection upon a screen, and an optical unit 4 that projects the light from the liquid crystal panel 3 towards the screen.

The structure of the polarization converting element 10 will now be explained with reference to FIGS. 2(a) through (c).

The polarization converting element 10 includes a cylindrical element main body 10a, one end of which is closed and that is made from a transparent material, and the lower portion of this element main body 10a is formed as a cylindrical leg portion 10b. And, as shown in FIGS. 2(b) and 2(c), it possesses a rotationally symmetric shape having an axis of rotational symmetry that is parallel to the Z axis. In the element main body 10a of the polarization converting element 10, there are provided an incident section 11 upon which the light L1 from the LED 1 is incident, an annular reflecting section 13 that is formed around the periphery of this incident section 11, and a polarization splitting section 12 that is formed upon the surface at the side where the light L1 is emitted. The incident section 11, the annular reflecting section 13, and the polarization splitting section 12 are also made in rotationally symmetric shapes.

The polarization converting element 10 is an element that aligns the polarization components of the light L1 that is emitted by the LED 1 into one polarization, and emits the resulting light. In other words, the p-polarized light component of the light L1 that is incident from the LED 1 upon the incident section 11 passes through with its optical path somewhat spread out by the polarization splitting section 12. On the other hand, the s-polarized light component of the light L1, that is incident from the LED 1 upon the incident section 11, is reflected by the polarized splitting section 12 and is incident upon the annular reflecting section 13. And then, it is reflected by this annular reflecting section 13 and is converted into a p-polarized light component so as to pass through the polarization splitting section 12.

In order to provide this type of optical function to the polarization converting element 10, the incident section 11 of the polarization converting element 10 is made in a convex lens shape to which a curvature is imparted, so as to convert the incident light L1 into an approximately parallel light beam. And the polarization splitting section 12 presents a concave conical surface that subtends a predetermined angle with the X-Y plane, and is made by forming a polarization splitting layer (Polarization Beam Splitter or PBS) upon a concave conical surface of the element main body 10a. Moreover, the annular reflecting section 13 presents a convex conical surface that subtends a predetermined angle with the X-Y plane, and is made by forming upon a convex conical surface of the element main body 10a, in order, a quarter-wave plate 13a and a total reflection layer 13b. It should be understood that, instead of being formed in a convex lens shape, provided that it is endowed with a condensing function, the incident section 11 may also be formed in the shape of a Fresnel lens.

The polarized light conversion process performed by the polarization converting element 10 will now be explained with reference to FIGS. 2(a) through (c) and FIGS. 3(a) through (f). Non-polarized light L1 is emitted at a fixed emission angle from the LED 1, that is a point light source, and all of this light is incident upon the incident section 11 of the polarization converting element 10. As shown in FIG. 3(a), this incident light L1 is changed into approximately parallel light due to the refraction operation of the incident section 11, and proceeds into the interior of the polarization converting element 10.

Among this parallel light, as shown in FIG. 3(b), the portion thereof that is a polarized light component in one direction (the p-polarized light) passes through the polarization splitting section 12 and is emitted to the exterior as transmitted light L2. At this time, this transmitted light L2 is subjected to a refraction operation due to the fact that the polarization splitting section 12 is formed as a concave conical surface, and is emitted outwardly at an angle θ1 with respect to the optical axis AX (refer to FIG. 2(a)).

Furthermore, among this parallel light, the portion thereof that is a polarized light component in the other direction (the s-polarized light) is internally reflected by the polarization splitting section 12, and this reflected light L3 progresses within the interior of the polarization converting element 10, and arrives at the annular reflecting section 13. At this time, the relationship between the angle of inclination of the concave conical surface of the polarization splitting section 12 and the angle of inclination of the convex conical surface of the annular reflecting section 13 is set so that all of the reflected light L3 is directed towards the annular reflecting section 13.

The reflected light that has arrived at the annular reflecting section 13 is converted from linearly s-polarized light into circularly polarized light by passing through the quarter-wave plate 13a, and then is converted from circularly polarized light to linearly p-polarized light by being reflected by the total reflection layer 13b and passing through the quarter-wave plate 13a for a second time. In other words, the reflected s-polarized light L3 is converted into linearly p-polarized light L4 by its direction of polarization being rotated through 90°. And, as shown in FIG. 3(c), this linearly p-polarized light L4 proceeds towards the polarization splitting section 12. And, as shown in FIG. 3(d), having arrived at the polarization splitting section 12, this linearly p-polarized light L4 is emitted to the exterior as transmitted light L4, since it is able to pass through the polarization splitting section 12. This transmitted light L4 is subjected to a refraction operation, since it is incident at an angle upon the concave conical surface of the polarization splitting section 12, and is thus emitted inwardly at an angle θ2 with respect to the optical axis AX (refer to FIG. 2(a)).

As a result, all of the light that is emitted from the polarization converting element 10, in other words the transmitted light L2 and the transmitted light L4, becomes light having a p-polarized light component. In other words, as shown in FIG. 3(e), the transmitted light L2 becomes a ray bundle that is emitted outwardly with respect to the optical axis AX, while, as shown in FIG. 3(f), the transmitted light L4 becomes a ray bundle that is emitted inwardly with respect to the optical axis AX; and these two ray bundles, both of which have a p-polarized light component, are emitted from the polarization converting element 10 so as to become combined. In the p-polarized light that results from combination of these two ray bundles, almost the same amount of light as the light L1 from the LED 1 is preserved.

Furthermore, the light L1 from the LED 1, that is a point light source, acquires a ray bundle cross sectional area (beam diameter) of a predetermined magnitude when it is emitted from the polarization converting element 10. This is because, among the light L1 that is incident upon the polarization converting element 10, its s-polarized component is multiply internally reflected by the polarization splitting section 12 and the annular reflecting section 13, so that its beam diameter is magnified. The magnitude of this beam diameter can be adjusted in conformance with the illumination area of the liquid crystal panel 3, by changing the angle of inclination of the concave conical surface of the polarization splitting section 12 and the angle of inclination of the convex conical surface of the annular reflecting section 13.

Referring to FIG. 1 again, the process of progression of the transmitted light beams L2 and L4, after they have been emitted from the polarization converting element 10, will now be explained. The p-polarized light formed by the combination of these two ray bundles arrives at the liquid crystal panel 3, and its direction of polarization is rotated through 90° by passing through the liquid crystal panel 3, so that it becomes s-polarized light. The transmitted light L5, that is s-polarized light, is conducted to the optical unit 4.

The optical unit 4 includes a prism block 5 and a condensing mirror 6, and a polarization splitting layer (PBS) 5a and a quarter-wave plate 5b are provided to the prism block 5. The surface 5A of the prism block 5 on its incident side is parallel to the X-Y plane, while its surface 5B on its emission side is parallel to the Y-Z plane. The polarization splitting layer 5a is provided upon a surface that makes an angle of 45° with respect to both the surface 5A on the incident side and the surface 5B on the emission side, while the quarter-wave plate 5b is disposed upon the surface 5B on the emission side.

As described above, the transmitted light L5 that passes through the liquid crystal panel 3, and that is s-polarized light, is conducted to the optical unit 4. And this transmitted light L5, that is incident perpendicularly upon the incident surface 5A of the prism block 5, is reflected by the polarization splitting layer 5a in the −X direction (the rightwards direction in FIG. 1). This reflected light L6 is converted from linearly s-polarized light into circularly polarized light by passing through the quarter-wave plate 5b, and is then converted from circularly polarized light into linearly p-polarized light by being reflected by the condensing mirror 6 in the +X direction (the leftwards direction in FIG. 1) and by passing through the quarter-wave plate 5b for a second time. In other words, the direction of polarization of the transmitted light L5, that is linearly s-polarized light, is rotated through 90°, so that this light is converted into the transmitted light L7 that is linearly p-polarized light. This transmitted light L7 proceeds in the +X direction and passes through the polarization splitting layer 5a, so that the image upon the liquid crystal screen of the liquid crystal panel 3 is magnified and is projected upon a screen external to the projector 100, not shown in the figures.

Since, in this embodiment, the liquid crystal panel 3 is illuminated by the transmitted light L2 that is emitted outwardly with respect to the optical axis AX, and also by the transmitted light L4 that is emitted inwardly with respect to the optical axis AX, accordingly it is possible to change the ratio of the amounts of light that illuminate the central portion of the liquid crystal screen, and its peripheral portion, according to the position of the liquid crystal panel 3 along the direction of the optical axis. Generally, the light emitting intensity of an LED is greatest along the direction of its optical axis, and the directivity is strong. Furthermore, with an optical system, generally the center is brightest, and it becomes darker towards the periphery. Accordingly although, with normal illumination, upon a screen, there is a tendency for the periphery to be darker than the center, since, with the polarization converting element 10 of this embodiment, these two ray bundles are generated that have different emission angles, accordingly it is possible to illuminate the peripheral portion of the liquid crystal screen with a brightness equal to that of its central portion. As a result, a projected image is obtained in which there is no dropping off of the amount of light, even at the edge of the screen.

Furthermore since, the closer the light that illuminates the liquid crystal panel 3 is to being parallel, the greater the focal point depth becomes, accordingly any defects such as dust or damage upon the liquid crystal screen or the like, become easily visible to the eye. Since, with the projector 100 of this embodiment, the two ray bundles that are emitted from the polarization converting element 10 are not parallel to the optical axis AX, accordingly defects upon the liquid crystal screen are difficult to detect with the eye. As a result, a projected image is obtained in which, even if there are defects upon the screen, they do not stand out to the eye.

This polarization converting element 10 according to the first embodiment is able to provide the following advantageous operational effects.

(a) Since this polarization converting element 10 that is provided with the incident section 11, the annular reflecting section 13, and the polarization splitting section 12 is of a rotationally symmetric shape, and since it is built so that the directions of polarization are aligned to be the same by taking advantage of multiple internal reflections by the polarization splitting section 12 and the annular reflecting section 13, accordingly the element as a whole is compact.

(b) Since the incident section 11 is made in the shape of a convex lens, accordingly it is possible to conduct the light L1 from the LED 1, that is a point light source, without any waste, and to make it into parallel light.

(c) The beam diameter can be magnified by multiple internal reflections by the polarization splitting section 12 and the annular reflecting section 13, and it is possible to adjust the degree of this magnification as desired, according to the angle of inclination of the concave conical surface of the polarization splitting section 12 and the angle of inclination of the convex conical surface of the annular reflecting section 13.

Furthermore, the projector 100 that is equipped with this polarization converting element 10 according to the first embodiment is able to provide the following advantageous operational effects.

(d) Optical adjustment can be completed in a simple manner, only by ensuring that the axis of rotational symmetry of the polarization converting element 10 coincides with the optical axis of the light L1 from the LED 1.

(e) The matching with the LED 1, that is a point light source, is good, and it is possible to make the device as a whole more compact.

(f) Since the polarization converting element 10 creates the two ray bundles that have different emission angles, accordingly it is possible to illuminate the peripheral portion of the liquid crystal screen of the liquid crystal panel 3 at a brightness that is equal to that of its central portion.

(g) Since the two ray bundles that are emitted from the polarization converting element 10 are not parallel to the optical axis AX, accordingly any defects upon the liquid crystal screen do not easily stand out to the eye, as compared with the case of illumination with a parallel ray bundle.

Second Embodiment

Figure 4:
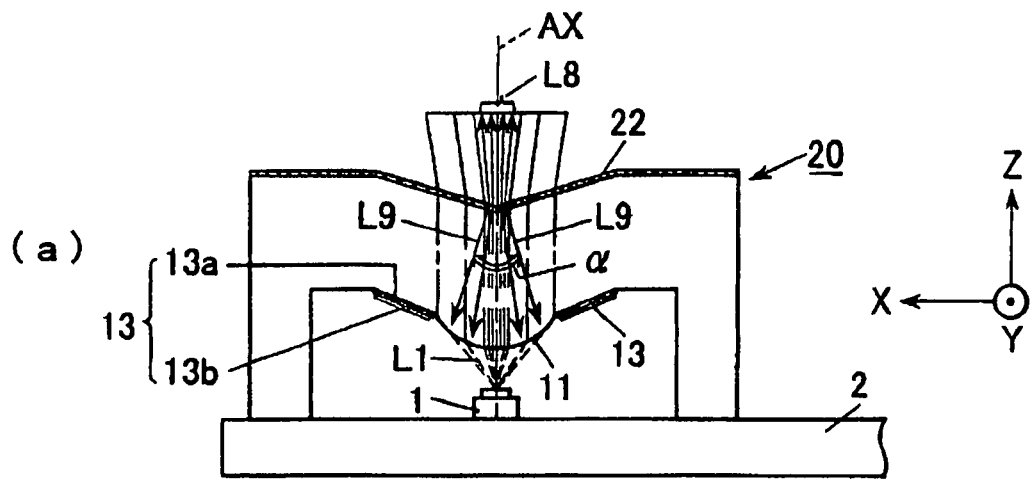
FIGS. 4(a) through 4(c) are sectional views schematically showing the structure of a polarization converting element according to a second embodiment of the present invention.
Figure 4:
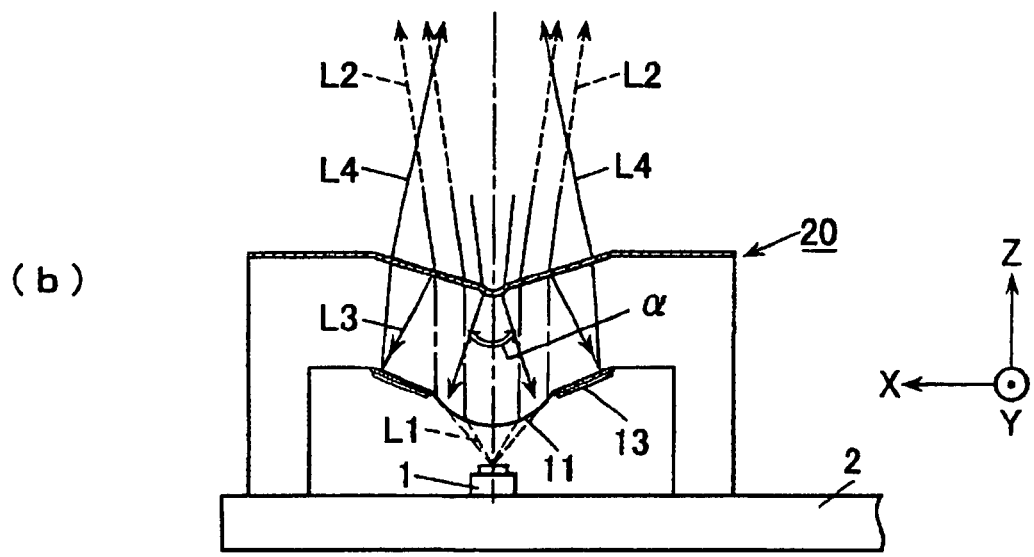
Figure 4:
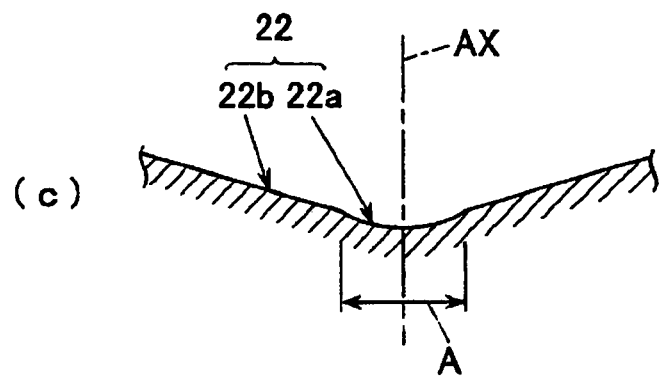

FIGS. 4(*a*) through 4(*c*) are sectional views schematically showing the structure of a polarization converting element according to a second embodiment of the present invention. FIG. 4(*a*) is a figure showing optical paths in the vicinity of the optical axis of this polarization converting element 20; FIG. 4(*b*) is a figure showing optical paths in peripheral portions of the polarization converting element 20 that are remote from its optical axis; and FIG. 4(*c*) is a partial enlarged view of a polarization splitting section 22 of the polarization converting element 20. In FIGS. 4(*a*) through 4(*c*), the same reference symbols are appended to structural components that are the same as ones shown in FIGS. 1 through 3(*f*), and the explanation thereof will herein be omitted.

The aspect in which the polarization converting element 20 shown in FIGS. 4(*a*) through 4(*c*) differs from the polarization converting element 10 according to the first embodiment shown in FIG. 1, is the shape of a polarization splitting section 22. In detail, by contrast to the polarization splitting section 12 of the polarization converting element 10 that is shaped as a concave conical surface, the polarization splitting section 22 of this polarization converting element 20 presents a concave spherical surface shape in the vicinity of the optical axis AX, and presents a concave conical surface shape similar to which of the polarization splitting section 12 around the outside thereof. In concrete terms, as shown in the partial enlarged view of FIG. 4(*c*), the polarization splitting section 22 is made up from a concave spherical surface portion 22*a* that appears in its region A, and a ring shaped concave conical surface portion 22*b* that surrounds this concave spherical surface portion 22*a*. Of course, a polarization splitting layer is formed upon the concave spherical surface portion 22*a* and the concave conical surface portion 22*b*.

The light L1 that is incident upon the polarization converting element 20 from the incident section 11 becomes approximately parallel light and proceeds through the interior of the polarization converting element 20. This parallel light includes, as shown in FIG. 4(*a*), along near the optical axis AX, parallel light that proceeds and arrives at the concave spherical surface portion 22*a* of the polarization splitting section 22, and, as shown in FIG. 4(*b*), parallel light that proceeds along a peripheral portion remote from the optical axis AX and arrives at the concave conical surface portion 22*b* of the polarization splitting section 22. With regard to the parallel light that arrives at the concave conical surface portion 22*b*, the explanation thereof will herein be curtailed since it is the same as explained with reference to the first embodiment; and only the parallel light that proceeds in the neighborhood of the optical axis AX and arrives at the concave spherical surface portion 22*a* will be explained.

Among the parallel light that has arrived at the concave spherical surface portion 22*a*, the light of one polarization component (the p-polarized light component) passes through the concave spherical surface portion 22*a* and is emitted to the exterior as transmitted light L8. At this time, this transmitted light L8 is not inclined to the outside with respect to the optical axis AX as much as is the transmitted light L2 shown in FIG. 4(*b*). In particular, the light upon the optical axis AX that is included in the transmitted light L8 is not subjected to any change of angle due to refraction, but rather proceeds directly.

And, among the parallel light that has arrived at the concave spherical surface portion 22*a*, the light of the other polarization component (the s-polarized light component) is reflected by the concave spherical surface portion 22*a*, and this reflected light L9 is directed in the direction of the incident section 11 at a spreading angle α. At this time, since this reflected light L9 is not tilted with respect to the optical axis AX as much as is the reflected light L3 shown in FIG. 4(*b*), accordingly it is not conducted to the annular reflecting section 13 but rather to the incident section 11, so that it comes to be emitted externally from the incident section 11, and only the amount of this emitted light comes to be lost.

According to the above, all of the light that is emitted from the polarization converting element 20, in other words the transmitted light L2, the transmitted light L4, and the transmitted light L8 becomes light having a p-polarized light component. The explanation of the structure of a device in which this polarization converting element 20 is mounted to a projector 100 instead of the polarization converting element 10 will be omitted, since the structure is the same as that of the first embodiment, apart from the substitution of the polarization converting element 20.

Now, with the polarization converting element 10 according to the first embodiment, since the transmitted light L2 is emitted towards the outside with respect to the optical axis AX, accordingly this transmitted light L2 does not reach the vicinity of the optical axis AX above the polarization converting element 10 (i.e. in the +Z direction). Furthermore, although the transmitted light L4 that is emitted after having been internally reflected within the polarization converting element 10 is emitted towards inwards with respect to the optical axis AX, still, directly above the polarization converting element 10, this transmitted light L4 does not reach as far as the optical axis AX. Due to this, it is not possible to dispose the liquid crystal panel 3 in the zone in which the light emitted from the polarization converting element 10, i.e. the transmitted light (L2+L4), is not present, so that a limitation is imposed upon the position of the liquid crystal panel 3.

By contrast, with the polarization converting element 20 of the second embodiment, since the transmitted light L8 that includes a light beam upon the optical axis AX is present, accordingly no zone occurs in which emitted light (transmitted light) is not present. Accordingly, no limitation is imposed upon the position of the liquid crystal panel 3. If the liquid crystal panel 3 is disposed directly above the polarization converting element 20, then it is possible to make the projector device as a whole more compact.

With this polarization converting element 20 according to the second embodiment as well, just as with the polarization converting element 10 according to the first embodiment, the beneficial operational effects (a) through (c) previously described above are available.

Furthermore, with a projector that incorporates the polarization converting element 20 according to the second embodiment as well, along with obtaining the advantageous operational effects (d) through (g) described above, also it is possible to dispose the liquid crystal panel 3 directly above the polarization converting element 20, so that the advantageous effect is obtained that it is possible to make the projector device as a whole more compact.

The present invention is not limited to the embodiments described above; provided that the gist of the present invention is not departed from, various types of alterations are possible. For example although, in the first and the second embodiment, the LED 1 was used as the point light source, it would also be acceptable to arrange to utilize a light emitting element such as a compact electric discharge lamp, or an EL or the like. Moreover although, in the projector 100 shown in FIG. 1, an optical system is employed in which the optical unit 4 is arranged as a subsequent stage to the liquid crystal panel 3, and the transmitted light L5 is bent into the −X direction by the polarization splitting layer 5a and is reflected in the +X direction by the condensing mirror 6, it would also be acceptable to employ an optical system in which the transmitted light L5 is bent into the +X direction by the polarization splitting layer, and is magnified and projected by a lens. Furthermore although, in the second embodiment, only in the vicinity of the optical axis AX, the polarization splitting section 22 of the polarization converting element 20 was formed in a concave spherical surface shape, it would also be acceptable to form this portion as a non-spherical surface; in fact, it would also be possible to utilize any curved surface, provided that is a curved surface with which blotching of the emitted light is mitigated.

Figure 5:
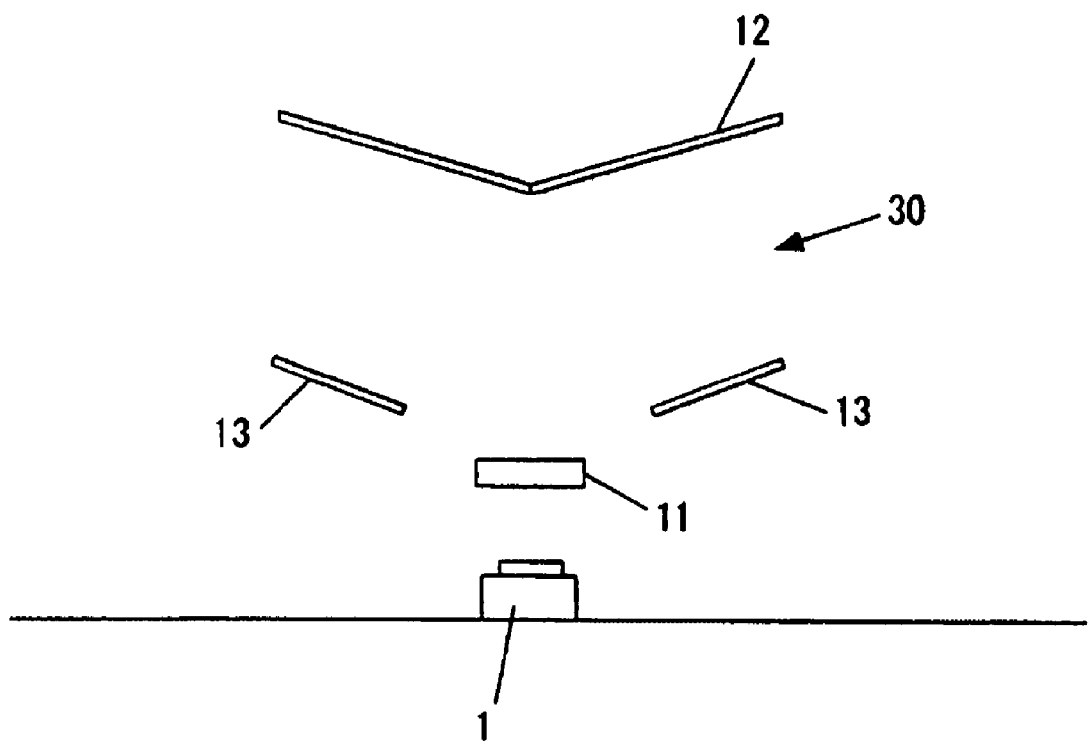
FIG. 5 is a figure schematically showing the structure of a polarization converting element according to a variant embodiment.

Yet further, in the above described first and second embodiment, the polarization converting element 10 was built by providing the incident section 11, the polarization splitting section 12, and the annular reflecting section 13 to the element main body 10a that was made from a transparent material. However, the structure of the polarization converting element 10 is not limited to this possibility. FIG. 5 schematically shows the structure of a polarization converting element (device) 30 according to a variant embodiment of the present invention. As shown in FIG. 5, this polarized light conversion device 30 is not provided with any element main body 10a. An incident section 11, a polarization splitting section 12, and an annular reflecting section 13 are supported in similar positions to their positions in the first and the second embodiment described above, for example by a frame that is not shown in the drawing. Even if the element main body 10a is omitted in this manner, it is still possible to obtain similar beneficial operational effects to those available with the first embodiment and the second embodiment described above.

Although various embodiments and variant embodiments have been explained in the above description, the present invention should not be considered as being limited by the details thereof. Other modes that may be contemplated within the technical scope of the present invention are also included within the range of the present invention.

The present application is based upon Japanese patent application 2005-026047 (filed on 2 Feb. 2005), and hereby incorporates its contents by reference.

The invention claimed is:

1. A polarization converting element, comprising:
    a main body that is made from a transparent member and that has the following integral sections of the main body:
    an incident section upon which light generated from a light source is incident;
    an annular reflecting section that is formed on the periphery of the incident section; and
    a polarization splitting section that is formed opposite to the annular reflecting section on the emission side of light incident upon the incident section, wherein:
    one polarized light component of the incident light passes through the main body and is emitted from the polarization splitting section; and
    another polarized light component of the incident light is reflected towards the annular reflecting section by the polarization splitting section, and is emitted from the polarization splitting section after having again been reflected by the annular reflecting section and having been converted into light of a same polarization component as the light of the one polarized light component.

2. A polarization converting element according to claim 1, wherein:
    the incident section is endowed with a condensing function.

3. A polarization converting element according to claim 1, wherein:
    the polarization splitting section is formed with an outwardly concave conical surface shape.

4. A polarization converting element according to claim 3, wherein:
    the polarization splitting section has a concave curved surface shape in the neighborhood of an axis of rotational symmetry of the concave conical surface; and
    the light of the one polarized light component is emitted from a portion of the concave curved surface shape substantially parallel to the axis of rotational symmetry.

5. A polarization converting element according to claim 1, wherein:
    the annular reflecting section is formed with an inwardly convex conical surface shape.

6. A polarization converting element according to claim 1, wherein:

the main body, the incident section, the annular reflecting section, and the polarization splitting section are formed with rotationally symmetric shapes.

7. A polarization converting element according to claim 1, wherein:

the main body is formed in a shape of a cylinder one end of which is closed by a wall having an inner surface, on which the incident section and the annular reflecting section are formed, and an outer surface, on which the polarization splitting section is formed.

8. A polarization converting element according to claim 1, wherein:

the polarization splitting section is a polarization splitting layer formed upon a surface of the main body.

9. A polarization converting element according to claim 1, wherein:

the annular reflecting section comprises a quarter-wave plate and a reflecting surface, formed upon a surface of the main body.

10. A projection device, comprising:

a light source;

a polarization converting element according claim 1, that emits light generated from the light source as light of a single polarized component;

a display panel upon which the light emitted from the polarization converting element is incident; and a projection optical system that projects light that has passed through the display panel upon a screen.

11. A projection device according to claim 10, wherein:

the light source is a point light source.

12. A projection device according to claim 10, wherein:

the projection optical system comprises a polarization splitting section, a quarter-wave plate, and a condensing mirror; and light that has passed through the display panel is reflected by the polarization splitting section and passes through the quarter-wave plate, and then, after having been reflected by the condensing mirror, passes through the quarter-wave plate and the polarization splitting section.

* * * * *